(12) United States Patent
Kim et al.

(10) Patent No.: US 10,984,951 B2
(45) Date of Patent: Apr. 20, 2021

(54) MULTILAYER CAPACITOR HAVING DUMMY ELECTRODES ON CORNERS OF DIELECTRIC LAYERS

(71) Applicant: SAMSUNG ELECTRO-MECHANICS CO., LTD., Suwon-si (KR)

(72) Inventors: Je Jung Kim, Suwon-si (KR); Do Young Jeong, Suwon-si (KR); Do Yeon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/269,748

(22) Filed: Feb. 7, 2019

(65) Prior Publication Data
US 2020/0043656 A1    Feb. 6, 2020

(30) Foreign Application Priority Data

Aug. 2, 2018  (KR) .......................... 10-2018-0090454

(51) Int. Cl.
*H01G 4/012*    (2006.01)
*H01G 4/30*    (2006.01)
(Continued)

(52) U.S. Cl.
CPC ............... *H01G 4/012* (2013.01); *H01G 4/30* (2013.01); *H01G 4/1227* (2013.01); *H01G 4/232* (2013.01)

(58) Field of Classification Search
CPC .......... H01G 4/005; H01G 4/08; H01G 4/012; H01G 4/30; H01G 4/232; H01G 4/1227;
(Continued)

(56) References Cited

U.S. PATENT DOCUMENTS

| | | | |
|---|---|---|---|
| 9,343,236 B2 * | 5/2016 | Kim | ...................... H01G 4/1227 |
| 2010/0002356 A1 * | 1/2010 | Yoshida | ................... H01G 4/30 |
| | | | 361/301.4 |

(Continued)

FOREIGN PATENT DOCUMENTS

| JP | 5893317 A | * | 6/1983 |
|---|---|---|---|
| JP | 09129476 A | * | 5/1997 |

(Continued)

*Primary Examiner* — David M Sinclair
(74) *Attorney, Agent, or Firm* — Morgan, Lewis & Bockius LLP

(57) ABSTRACT

A multilayer capacitor includes a capacitor body including an active region having a plurality of dielectric layers and a plurality of first and second internal electrodes, and upper and lower cover layers, the capacitor body having first to six surfaces, one ends of the plurality of first and second internal electrodes being exposed through the third and fourth surfaces, respectively; first and second external electrodes; and a plurality of dummy electrodes disposed on each of the plurality of dielectric layers in the active region, to be exposed through corners of the dielectric layers. Each of the plurality of dummy electrodes has a width of 60% or less of a distance between the first internal electrode and the fourth surface or a distance between the second internal electrode and the third surface, the width being in a direction from the third surface to the fourth surface.

10 Claims, 3 Drawing Sheets

(51) Int. Cl.
*H01G 4/12* (2006.01)
*H01G 4/232* (2006.01)

(58) Field of Classification Search
CPC ...... H01G 4/0085; H05K 1/0306; H05K 1/18; H05K 1/162
See application file for complete search history.

(56) References Cited

U.S. PATENT DOCUMENTS

| | | | | |
|---|---|---|---|---|
| 2012/0134068 A1* | 5/2012 | Chae | ........................ | H01G 4/012 361/321.2 |
| 2012/0314338 A1* | 12/2012 | Togashi | .................. | H01G 4/30 361/306.3 |
| 2013/0093556 A1* | 4/2013 | Lim | ........................ | H01F 27/29 336/200 |
| 2013/0155574 A1* | 6/2013 | Park | ........................ | H01G 4/012 361/321.3 |
| 2014/0240895 A1* | 8/2014 | Lee | .......................... | H01G 4/12 361/301.4 |
| 2015/0348711 A1* | 12/2015 | Kim | ....................... | H01G 4/1227 174/260 |
| 2016/0233024 A1* | 8/2016 | Kim | ........................ | H01G 4/012 |
| 2016/0240311 A1* | 8/2016 | Lee | ........................ | H01G 4/012 |
| 2016/0240317 A1* | 8/2016 | Ro | .......................... | H01G 4/30 |
| 2017/0345569 A1 | 11/2017 | Sakatsume et al. | | |

FOREIGN PATENT DOCUMENTS

| | | | |
|---|---|---|---|
| JP | 2002305127 A | * | 10/2002 |
| JP | 2003282356 A | * | 10/2003 |
| JP | 2005032807 A | * | 2/2005 |
| JP | 2016-021437 A | | 4/2016 |
| KR | 10-2017-0135664 A | | 12/2017 |

\* cited by examiner

MULTILAYER CAPACITOR HAVING DUMMY ELECTRODES ON CORNERS OF DIELECTRIC LAYERS

CROSS-REFERENCE TO RELATED APPLICATION

This application claims the benefit of 35 U.S.C. § 119(a) of Korean Patent Application No. 10-2018-0090454 filed on Aug. 2, 2018 in the Korean Intellectual Property Office, the entire disclosure of which is incorporated herein by reference for all purposes.

TECHNICAL FIELD

The present disclosure relates to a multilayer capacitor.

BACKGROUND

Multilayer capacitors have positive characteristics in terms of miniaturization and implementing high capacity, while having ease in mounting. Thus, multilayer capacitors may be mounted on the circuit boards of various types of electronic products, including display devices such as a liquid crystal display (LCD), a plasma display panel (PDP) or the like, computers, smartphones and mobile phones, serving to charge or discharge electricity.

Such multilayer capacitors are provided with margins in a length direction and a width direction, and these margins may serve to protect internal electrodes from electrical stress, moisture, and plating liquid.

Thus, to secure reliability, a minimum margin should be secured. In the case in which such a margin is insufficient, products may be defective.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer capacitor in which at least a relative minimum margin of a capacitor body may be secured to ensure reliability.

According to an aspect of the present disclosure, a multilayer capacitor includes a capacitor body including an active region having a plurality of dielectric layers and a plurality of first and second internal electrodes alternately disposed with the dielectric layer interposed therebetween, and upper and lower cover layers disposed on upper and lower surfaces of the active region, the capacitor body having a first surface and a second surface opposing each other, a third surface and a fourth surface connected to the first and second surfaces and opposing each other, and a fifth surface and a sixth surface connected to the first and second surfaces, connected to the third and fourth surfaces and opposing each other, one ends of the plurality of first and second internal electrodes being exposed through the third surface and the fourth surface, respectively; a first external electrode and a second external electrode disposed on ends of the capacitor body, respectively; and a plurality of dummy electrodes disposed on each of the plurality of dielectric layers in the active region, to be exposed through corners of the dielectric layers. Each of the plurality of dummy electrodes has a width equal to 60% or less of a distance between the first internal electrode and the fourth surface of the capacitor body or a distance between the second internal electrode and the third surface of the capacitor body, the width being in a direction from the third surface to the fourth surface of the capacitor body.

According to another aspect of the present disclosure, a multilayer capacitor includes a capacitor body including an active region having a plurality of dielectric layers and a plurality of first and second internal electrodes alternately disposed with the dielectric layer interposed therebetween, and upper and lower cover layers disposed on upper and lower surfaces of the active region, the capacitor body having a first surface and a second surface opposing each other, a third surface and a fourth surface connected to the first and second surfaces and opposing each other, and a fifth surface and a sixth surface connected to the first and second surfaces, connected to the third and fourth surfaces and opposing each other, one ends of the plurality of first and second internal electrodes being exposed through the third surface and the fourth surface, respectively; a first external electrode and a second external electrode disposed on ends of the capacitor body, respectively; and a plurality of dummy electrodes disposed on each of the plurality of dielectric layers in the active region, to be exposed through corners of the dielectric layers. Each of the plurality of dummy electrodes has a length equal to 60% or less of a distance between the first internal electrode and the fifth or sixth surface of the capacitor body or a distance between the second internal electrode and the fifth or sixth surface of the capacitor body, the length being in a direction from the fifth surface to the sixth surface of the capacitor body.

Each of the plurality of dummy electrodes may have the width equal to 50% to 60% of the distance between the first internal electrode and the fourth surface of the capacitor body or the distance between the second internal electrode and the third surface of the capacitor body, in the direction from the third surface to the fourth surface of the capacitor body.

The plurality of dummy electrodes may be provided as a total of four dummy electrodes, of which each is disposed on one of four corners of a single dielectric layer on which the first internal electrode or the second internal electrode is disposed.

A length ratio of exposed portions of two dummy electrodes disposed on one dielectric layer, exposed through the third surface or the fourth surface of the capacitor body, may satisfy 1:9 to 5:5.

A length ratio of exposed portions of two dummy electrodes disposed on one dielectric layer, exposed through the fifth surface or the sixth surface of the capacitor body, may satisfy 1:9 to 5:5.

The first external electrode and the second external electrode may include a first connection portion and a second connection portion disposed on the third and fourth surfaces of the capacitor body to be connected to the first and second internal electrodes, respectively, and a first band portion and a second band portion respectively extending from the first and second connection portions to portions of the first, second, fifth and sixth surfaces of the capacitor body, respectively.

Other features and aspects of the present disclosure will be apparent from the following detailed description, the drawings, and the claims.

BRIEF DESCRIPTION OF DRAWINGS

The above and other aspects, features, and advantages of the present disclosure will be more clearly understood from the following detailed description, taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
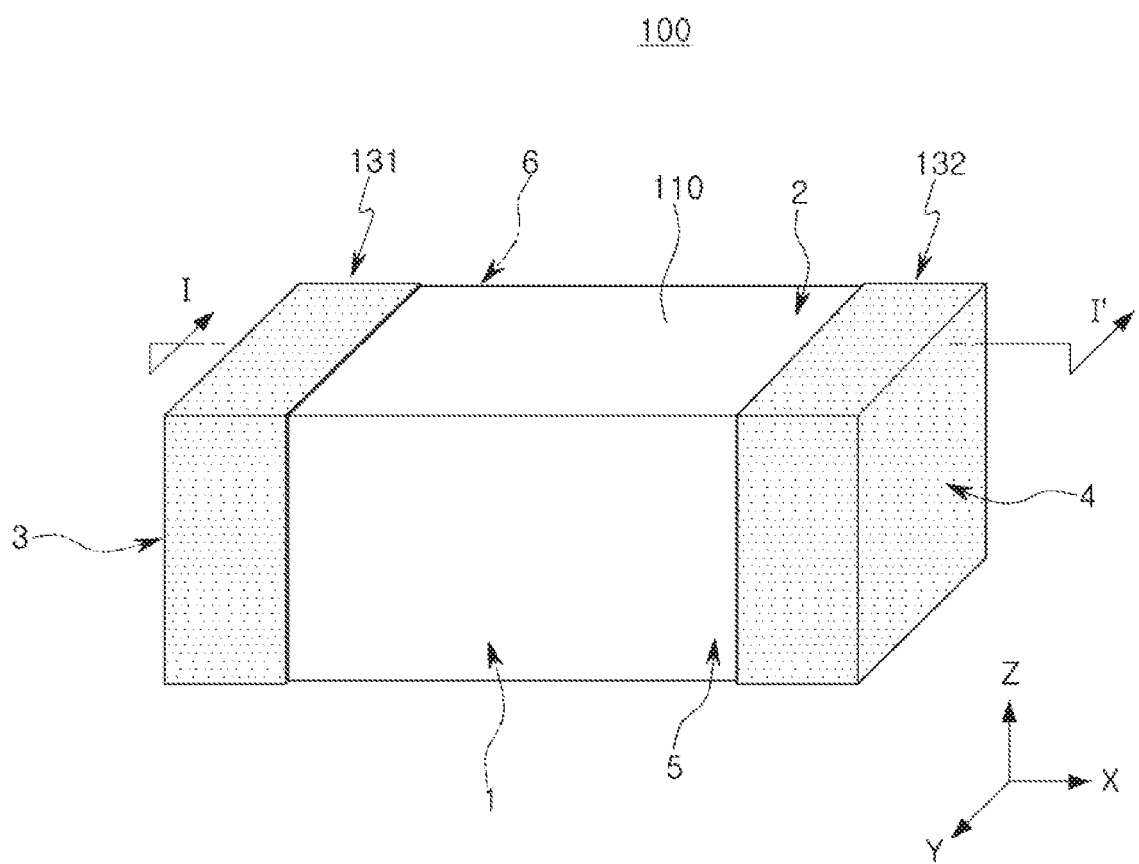
FIG. 1 is a perspective view illustrating an example of a multilayer capacitor according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. As used herein, the term "and/or" includes any one and any combination of any two or more of the associated listed items. The articles "a," "an," and "the" are intended to include the plural forms as well, unless the context clearly indicates otherwise.

The use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower," relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

Hereinafter, when the direction of a capacitor body 110 is defined to clearly explain embodiments of the present disclosure, X, Y and Z shown in the drawings represent the length direction, the width direction and the thickness direction of the capacitor body 110, respectively. Further, in examples described below, the Z direction may be used in the same concept as the lamination direction in which dielectric layers are laminated.

Figure 2:
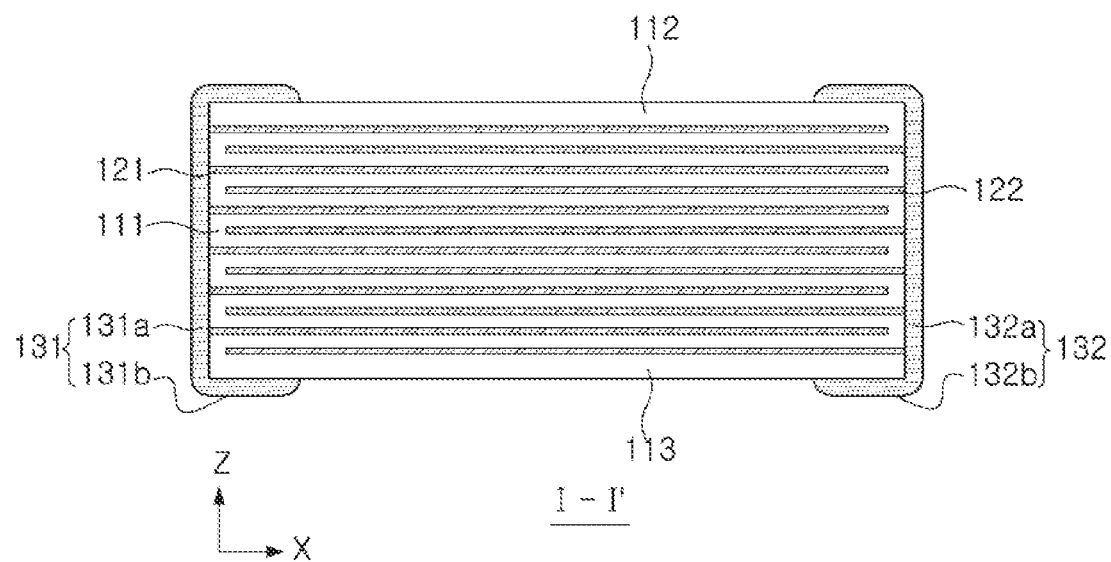
FIG. 2 is a cross-sectional view taken along line I-I' of FIG. 1.
Figure 3:
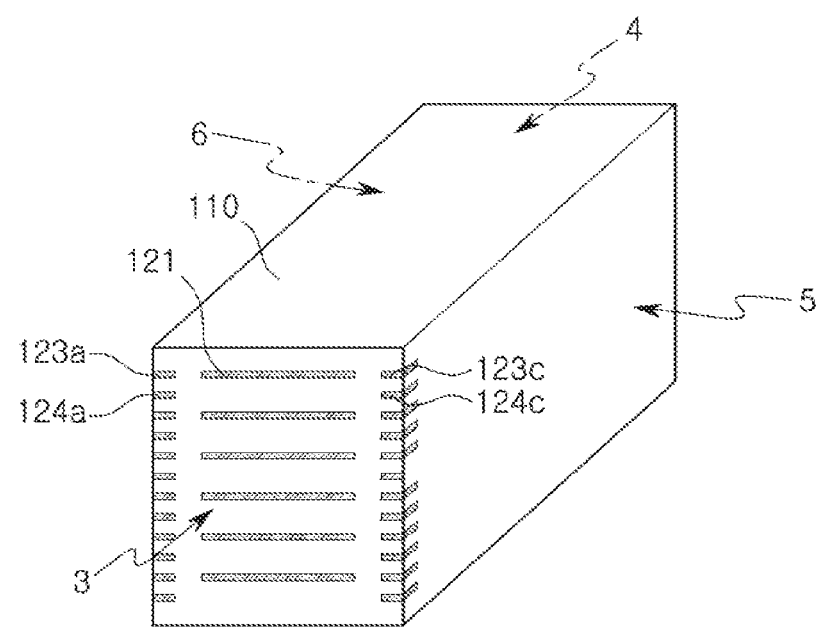
FIG. 3 is a perspective view of FIG. 1 from which first and second external electrodes are omitted.
Figure 4A:
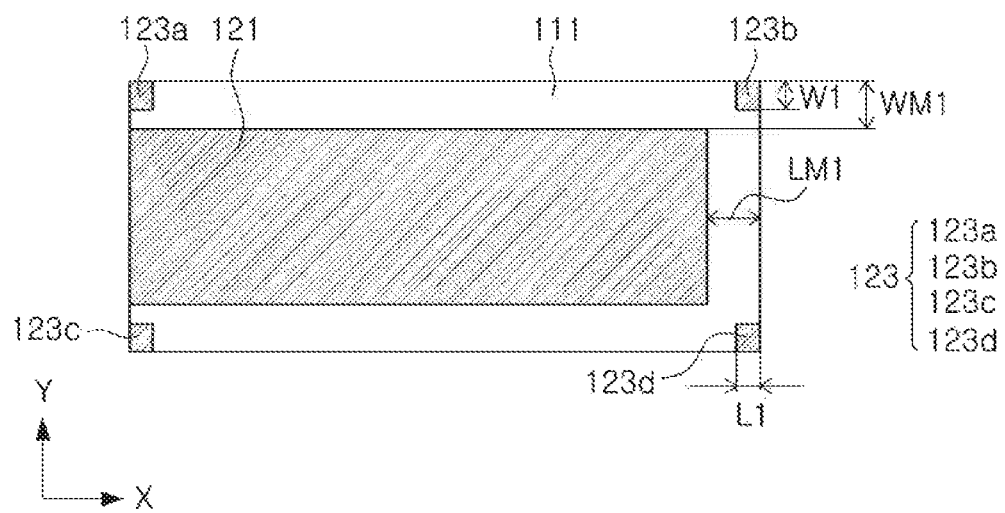
FIGS. 4A and 4B are plan views illustrating examples of dummy electrodes and first and second internal electrodes included in a capacitor body of FIG. 3.
Figure 4B:
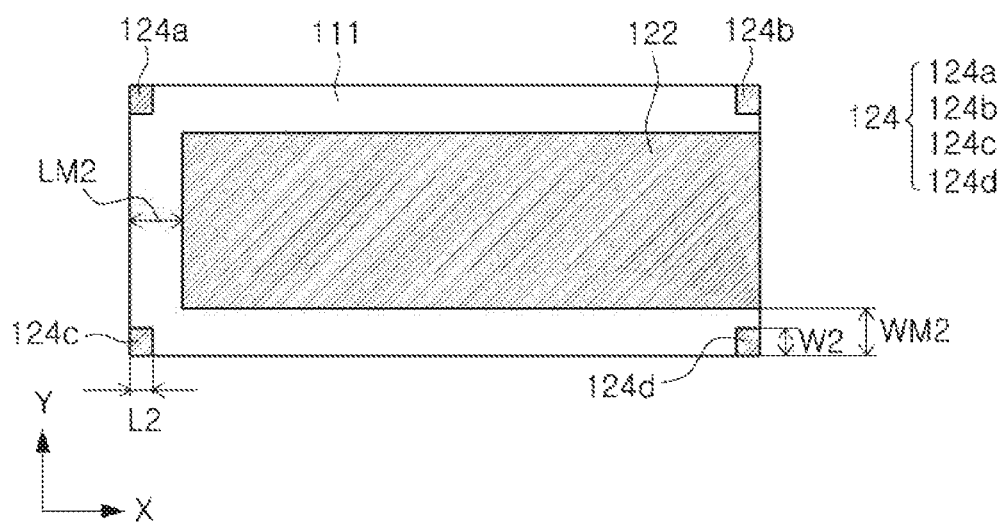

FIG. 1 is a perspective view illustrating an example of a multilayer capacitor, FIG. 2 is a cross-sectional view taken along line I-I' of FIG. 1, FIG. 3 is a perspective view of FIG. 1 from which first and second external electrodes are omitted, and FIGS. 4A and 4B are plan views illustrating first and second internal electrodes and dummy electrodes included in the capacitor body of FIG. 3.

Referring to FIGS. 1 to 4B, a multilayer capacitor 100 according to an example includes a capacitor body 110, first and second external electrodes 131 and 132, and a plurality of first and second dummy electrodes 123 and 124.

The capacitor body 110 is formed by laminating a plurality of dielectric layers 111 in a Z direction and then sintering the plurality of laminated dielectric layers 111. In this case, the plurality of dielectric layers 111 forming the capacitor body 110 may be in a sintered state, and may be integrated such that it may be difficult to confirm a boundary between adjacent dielectric layers 111 without using a scanning electron microscope (SEM).

In this case, the capacitor body 110 may have a generally hexahedral shape, but the shape of the capacitor body is not limited thereto. The shape and dimensions of the capacitor body 110 and the number of laminated layers of the dielectric layers 111 are not limited to those shown in the drawings.

In this example, for convenience of explanation, two surfaces of the capacitor body 110 opposing each other in the Z direction are referred to as first and second surfaces 1 and 2, two surfaces of the capacitor body 110 connected to the first and second surfaces 1 and 2 and opposing each other in an X direction are referred to as third and fourth surfaces 3 and 4, and two surfaces thereof connected to the first and second surfaces and opposing each other in a Y direction are referred to as fifth and sixth surfaces 5 and 6. In this example, the first surface 1 may be a surface in a mounting direction.

The dielectric layer 111 may include a ceramic material having a high dielectric constant, for example, a barium titanate ($BaTiO_3$)-based or strontium titanate ($SrTiO_3$)-based ceramic powder, or the like, but the ceramic material is not limited thereto. For example, any ceramic material may be used as long as sufficient capacitance may be obtained therefrom.

A ceramic additive, an organic solvent, a plasticizer, a binder, a dispersant may the like may further be added to the dielectric layer 111, together with the ceramic powder.

The ceramic additive may be, for example, a transition metal oxide or a transition metal carbide, a rare earth element, magnesium (Mg), aluminum (Al), or the like.

The capacitor body 110 may be configured to include an active region serving as a portion contributing to capacitance formation of a capacitor, and upper and lower cover layers 112 and 113 formed on upper and lower portions of the active region, respectively, as upper and lower margin portions.

The active region includes a plurality of first and second internal electrodes 121 and 122 disposed alternately with the dielectric layer 111 interposed therebetween, and one ends of the first and second internal electrodes 121 and 122 are exposed through the third and fourth surfaces 3 and 4 of the capacitor body 110, respectively.

The upper and lower cover layers 112 and 113 may have the same material and configuration as those of the dielectric layer 111, except that the upper and lower cover layers 112 and 113 do not include internal electrodes.

The upper and lower cover layers 112 and 113 may be formed by laminating a single dielectric layer or two or more dielectric layers on the upper and lower surfaces of the active region in the Z direction, respectively. The upper and lower cover layers 112 and 113 may basically serve to prevent the internal electrodes 121 and 122 from being damaged by physical or chemical stress.

The first and second internal electrodes 121 and 122 are electrodes having different polarities and are formed by printing a conductive paste, containing a conductive metal, to a predetermined thickness on the dielectric layer 111, and may be electrically insulated from each other by the dielectric layers 111 disposed therebetween.

The conductive metal may be one of, for example, silver (Ag), palladium (Pd), platinum (Pt), nickel (Ni) and copper (Cu), or alloys thereof, but is not limited thereto.

The conductive paste may be printed by a screen printing method, a gravure printing method or the like, but an example thereof is not limited thereto.

The first and second internal electrodes 121 and 122 are electrically connected to first and second external electrodes 131 and 132 through portions of the first and second internal electrodes alternately exposed through the third and fourth surfaces 3 and 4 of the capacitor body 110, respectively.

Thus, when a voltage is applied to the first and second external electrodes 131 and 132, charges are accumulated between the first and second internal electrodes 121 and 122.

In this case, capacitance of the multilayer capacitor 100 is proportional to an overlapping area of the first and second internal electrodes 121 and 122 overlapping each other in the Z direction in the active region.

Voltages of different polarities are provided to the first and second external electrodes 131 and 132. The first and second external electrodes 131 and 132 are disposed on both ends of the capacitor body 110 in the X direction, to be in contact with the exposed portions of the first and second internal electrodes 121 and 122 to be electrically connected thereto, respectively.

A plating layer (not illustrated) may be formed on surfaces of the first and second external electrodes 131 and 132 as required.

For example, the first and second external electrodes 131 and 132 may include first and second conductive layers, first and second nickel (Ni) plating layers formed on the first and second conductive layers, first and second tin (Sn) plating layers formed on the first and second nickel plating layer, respectively.

The first external electrode 131 may include a first connection portion 131a and a first band portion 131b.

The first connection portion 131a is disposed on the third surface 3 of the capacitor body 110 to be connected to the first internal electrode 121. The first band portion 131b is configured to extend from the first connection portion 131a to portions of the first, second, fifth and sixth surfaces 1, 2, 5 and 6 of the capacitor body 110.

The second external electrode 132 may include a second connection portion 132a and a second band portion 132b.

The second connection portion 132a is disposed on the fourth surface 4 of the capacitor body 110 to be connected to the second internal electrode 122. The second band portion 132b is configured to extend from the second connection portion 132a to portions of the first, second, fifth and sixth surfaces 1, 2, 5 and 6 of the capacitor body 110.

In the case of the dummy electrode in this example, a plurality of dummy electrodes are disposed on each of the dielectric layers 111 laminated in the Z direction in the active region, in such a manner that the dummy electrodes are exposed through corners of the dielectric layers 111.

The dummy electrode includes a first dummy electrode 123 disposed on the dielectric layer 111 on which the first internal electrode 121 is disposed, and a second dummy electrode 124 disposed on the dielectric layer 111 on which the second internal electrode 122 is disposed.

In this case, in the case of the first and second dummy electrodes 123 and 124, considering that the dielectric layers 111 are substantially quadrangular, a total of four dummy electrodes may be disposed on four corners of one dielectric layer 111, respectively. In detail, each dummy electrode is disposed on each corner of one dielectric layer 111 and is spaced apart from the first and second internal electrodes 121 and 122.

As described above, the four first or second dummy electrodes 123 or 124 disposed on the corners of one dielectric layer 111 are spaced apart from each other in the X and Y directions.

The first and second dummy electrodes 123 and 124 configured as described above are exposed to the corners of the capacitor body 110 to be described later, to be able to be utilized in determining whether to secure a minimum margin value in the X and Y directions of the capacitor body 110.

On the other hand, in the X direction from the third surface 3 to the fourth surface 4 of the capacitor body 110, a length L1 of each first dummy electrode 123 may be 60% or less of a distance LM1 between the first internal electrode 121 and the fourth surface 4 of the capacitor body 110, and a length L2 of each second dummy electrode 124 may be 60% or less of a distance LM2 between the second internal electrode 122 and the third surface 3 of the capacitor body 110. If the ratio exceeds 60%, since a distance between the first dummy electrode 123 and the first internal electrode 121 and a distance between the second dummy electrode 124 and the second internal electrode 122 are reduced, a problem such as current leakage and short circuits may occur.

Further, in the Y direction from the fifth surface 5 to the sixth surface 6 of the capacitor body 110, a width W1 of each first dummy electrode 123 may be 60% or less of a distance WM1 between the first internal electrode 121 and the fifth surface 5 or the sixth surface 6 of the capacitor body 110, and a width W2 of each second dummy electrode 124 may be 60% or less of a distance WM2 between the second internal electrode 122 and the fifth surface 5 or the sixth surface 6 of the capacitor body 110. If the ratio exceeds 60%, since a distance between the first dummy electrode 123 and the first internal electrode 121 and a distance between the second dummy electrode 124 and the second internal electrode 122 are reduced, a problem such as current leakage and short circuits may occur.

In a manufacturing process of a multilayer capacitor according to the related art, a plurality of green sheets are laminated, compressed and then cut to a predetermined size to provide a capacitor body as a laminate.

In this case, a margin of the capacitor body may be shifted to one side during a process of laminating green sheets and cutting a green chip.

Thus, to secure a minimum Y-direction margin in the capacitor body 110 in the related art, a macro inspection or the like for inspecting a length-width direction cross section of a green chip, using an automatic device or macroscopically, is performed before an external electrode formation is terminated after cutting the green chip, thereby inspecting both a minimum margin in an X direction and a margin in a Y direction to determine a defective chip.

However, in the above-mentioned defective chip sorting method according to the related art, there is a serious deviation in the sorting ratio of defective chips, depending on the examiner or the inspection environment. Further, in some cases, some defective products having an excessively small defect, of several μm on one side, for example, in a Y-direction margin, may be erroneously selected as acceptable products.

Since insulation resistance (IR) is lower than a reference value in the case of a defective product in which a minimum margin is not secured, to reduce such defects, detecting a cut defective chip is required to increase to secure a minimum margin in the X direction and a minimum margin in the Y direction.

Meanwhile, in the example of the present disclosure, the plurality of first and second dummy electrodes 123 and 124 are disposed on four corners of the dielectric layer 111 and exposed through four corners of the dielectric layer 111, respectively.

The first dummy electrode 123 may include a 1-1 dummy electrode 123a exposed through the third surface 3 and the sixth surface 6 of the capacitor body 110, a 1-2 dummy electrode 123b exposed through the fourth and sixth surfaces 4 and 6 of the capacitor body 110, and a 1-3 dummy electrode 123c exposed through the third and fifth surfaces 3 and 5 of the capacitor body 110, and a 1-4 dummy electrode 123d exposed through the fourth surface 4 and the fifth surface 5 of the capacitor body 110.

In this case, for example, when a size ratio of exposed portions of the 1-1 dummy electrode 123a and the 1-2 dummy electrode 123b exposed through the sixth surface 6 of the capacitor body 110 satisfies 1:9 to 5:5, the chip is regarded as being a normal cutting chip.

For example, when the size ratio of exposed portions of the 1-3 dummy electrode 123c and the 1-4 dummy electrode 123d, exposed through the fifth surface 5 of the capacitor body 110, satisfies 1:9 to 5:5, the chip is regarded as being a normal cutting chip.

If this ratio is less than 1:9 or exceeds 5:5, the chip may be easily classified as a defective chip. In the case in which the ratio is less than 1:9, since the size of the dummy electrode is very small, it is almost like that there is nothing. Thus, in this example, the ratio 1:9 may be set as a minimum reference value of the defective sorting as described above.

This is also applied to the Y direction of the capacitor body 110, and thus, in the case in which the size ratio of exposed portions of the 1-1 dummy electrode 123a and the 1-3 dummy electrode 123c exposed through the third surface 3 of the capacitor body 110 satisfies 1:9 to 5:5, the chip is regarded as being a normal cutting chip.

When the size ratio of exposed portions of the 1-2 dummy electrode 123b and the 1-4 dummy electrode 123d exposed through the fourth surface 4 of the capacitor body 110 satisfies 1:9 to 5:5, the chip is regarded as being a normal cutting chip.

If the size ratio thereof is less than 1:9 or exceeds 5:5, the chip may be easily classified as a defective chip.

The second dummy electrode 124 includes a 2-1 dummy electrode 124a exposed through the third surface 3 and the sixth surface 6 of the capacitor body 110, a 2-2 dummy electrode 124b exposed through the fourth surface 4 and the sixth surface 6 of the capacitor body 110, a 2-3 dummy electrodes 124c exposed through the third surface 3 and the fifth surface 5 of the capacitor body 110, and a 2-4 dummy electrode 124d exposed through the fourth surface 4 and the fifth surface 5 of the capacitor body 110.

In this case, when the size ratio of exposed portions of the 2-1 dummy electrode 124a and the 2-2 dummy electrode 124b exposed through the sixth surface 6 of the capacitor body 110 satisfies 1:9 to 5:5, the chip is regarded as being a normal cutting chip.

For example, when the size ratio of exposed portions of the 2-3 dummy electrode 124c and the 2-4 dummy electrode 124d exposed through the fifth surface 5 of the capacitor body 110 satisfies 1:9 to 5:5, the chip is regarded as being a normal cutting chip.

If the size ratio thereof is less than 1:9 or exceeds 5:5, the chip may be easily classified as a defective chip.

This may be equally applied to the Y direction of the capacitor body 110, and thus, when the size ratio of exposed portions of the 2-1 dummy electrode 124a and the 2-3 dummy electrode 124c exposed through the third surface 3 of the capacitor body 110 satisfies 1:9 to 5:5, the chip may be regarded as being a normal cutting chip.

When the size ratio of exposed portions of the 2-2 dummy electrode 124b and the 2-4 dummy electrode 124d exposed through the fourth surface 4 of the capacitor body 110 satisfies 1:9 to 5:5, the chip may be regarded as being a normal cutting chip.

If the size ratio thereof is less than 1:9 or exceeds 5:5, the chip may be easily classified as a defective chip.

Experimental Example

Table 1 shows the results of high temperature and high humidity load tests with different lengths of dummy electrodes.

A plurality of green sheets and internal electrodes were laminated and then cut to prepare laminates. After performing a plasticitizing process and a firing process, external electrodes were formed on both ends, and nickel and plating layers were formed. The length and width of the resultant were 16 mm and 8 mm, respectively, thereby manufacturing a multilayer capacitor having electrical characteristics of 47 uF.

In this case, it is defined that a comparative example (REF) is a case in which a dummy electrode was not formed, and in the case of embodiments in the present disclosure, there were a sample A in which a dummy electrode having a length of 10% with respect to a Y direction margin was disposed, sample B in which the dummy electrode having a length of 20% thereto was disposed, sample C in which the dummy electrode having a length of 30% thereto was disposed, sample D in which the dummy electrode having a length of 40% thereto was disposed, sample E in which the dummy electrode having a length of 50% thereto was disposed, sample F in which the dummy electrode having a length of 60% thereto was disposed, sample G in which the dummy electrode having a length of 70% thereto was disposed, and sample H in which the dummy electrode having a length of 80% thereto was disposed.

In this case, the samples in which the ratio of exposed lengths of two dummy electrodes exposed through the third and fourth surfaces of the capacitor body is less than 1:9, or one side dummy electrode is not visible, were selectively excluded.

Table 1 shows the results of load tests for 400 specimens for each sample, under the conditions of 85° C., 85 RH (%) and 6.3V for a total of 100 hours. In this case, when even one specimen does not pass the test, a relevant sample is determined as being defective.

TABLE 1

| | 85° C., 85 RH(%), 6.3 Vdc | | | | |
|---|---|---|---|---|---|
| | 2 hr | 24 hr | 48 hr | 72 hr | 100 hr |
| Sample A | 0/400 | 0/400 | 0/400 | 0/400 | 0/400 |
| Sample B | 0/400 | 0/400 | 0/400 | 0/400 | 0/400 |
| Sample C | 0/400 | 0/400 | 0/400 | 0/400 | 0/400 |
| Sample D | 0/400 | 0/400 | 0/400 | 0/400 | 0/400 |
| Sample E | 0/400 | 0/400 | 0/400 | 0/400 | 0/400 |
| Sample F | 0/400 | 0/400 | 0/400 | 0/400 | 0/400 |
| Sample G | 3/400 | 3/400 | 4/400 | 6/400 | 8/400 |
| Sample H | 4/400 | 8/400 | 11/400 | 12/400 | 12/400 |
| REF | 6/400 | 9/400 | 18/400 | 20/400 | 21/400 |

Referring to Table 1, it can be confirmed that no defects were observed in the case of samples A to F in which the ratio of the margin of the capacitor body in the Y direction and the width of the dummy electrode in the Y direction was 60% or less, and defects occurred after 2 hours in the comparative example and in samples G and H in which the ratio of the margin of the capacitor body in the Y direction and the width of the dummy electrode in the Y direction exceeded 60%.

Therefore, it can be appreciated that the ratio of the Y direction margin of the capacitor body to the Y direction width of the dummy electrode may be 60% or less.

These numerical values may also be similarly applied to the ratio of an X direction margin of the capacitor body and an X direction length of the dummy electrode as shown in Table 2 below.

TABLE 2

| | 85° C., 85 RH(%), 6.3 Vdc | | | | |
|---|---|---|---|---|---|
| | 2 hr | 24 hr | 48 hr | 72 hr | 100 hr |
| Sample A | 0/400 | 0/400 | 0/400 | 0/400 | 0/400 |
| Sample B | 0/400 | 0/400 | 0/400 | 0/400 | 0/400 |
| Sample C | 0/400 | 0/400 | 0/400 | 0/400 | 0/400 |
| Sample D | 0/400 | 0/400 | 0/400 | 0/400 | 0/400 |
| Sample E | 0/400 | 0/400 | 0/400 | 0/400 | 0/400 |
| Sample F | 0/400 | 0/400 | 0/400 | 0/400 | 0/400 |
| Sample G | 3/400 | 1/400 | 3/400 | 4/400 | 3/400 |
| Sample H | 3/400 | 3/400 | 6/400 | 5/400 | 5/400 |
| REF | 7/400 | 6/400 | 10/400 | 8/400 | 9/400 |

Table 3 below shows the results of high temperature and high humidity load tests for contactability of dummy electrodes with different lengths of dummy electrodes.

The capacitance contact in Table 3 below may represent an electrical connection between internal electrodes and external electrodes. For example, in a case in which a portion of the internal electrodes is not connected to the external electrode, the capacitance may be measured to be lower than a reference capacitance. Numerical values in Table 3 below indicate such capacity %.

TABLE 3

| | Capacitance Contact 2 hr |
|---|---|
| Sample A | 81% |
| Sample B | 85% |
| Sample C | 82% |
| Sample D | 84% |
| Sample E | 95% |
| Sample F | 92% |
| Sample G | 93% |
| Sample H | 90% |
| REF | 83% |

Referring to Table 3, since the lengths of the dummy electrodes in samples A, B, C and D were not relatively great, no significant difference was observed with respect to the contactability thereof as compared with the comparative example. However, in the case of samples E, F, G and H, it can be confirmed that the contactability is greatly improved as compared with the comparative example. Thus, it can be seen that a ratio of the Y direction margin of the capacitor body and the Y direction width of the dummy electrode is, in detail, 50% or more.

As set forth above, according to an exemplary embodiment, dummy electrodes may be disposed on corners of a dielectric layer in an active region to secure a relative minimum margin of a capacitor body in a length direction and a width direction, thereby securing the reliability of a multilayer capacitor While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor comprising:
a capacitor body including an active region having a plurality of dielectric layers and a plurality of first and second internal electrodes alternately disposed with the dielectric layer interposed therebetween, and upper and lower cover layers disposed on upper and lower surfaces of the active region, the capacitor body having a first surface and a second surface opposing each other, a third surface and a fourth surface connected to the first and second surfaces and opposing each other, and a fifth surface and a sixth surface connected to the first and second surfaces, connected to the third and fourth surfaces and opposing each other, one ends of the plurality of first and second internal electrodes being exposed through the third surface and the fourth surface, respectively;
a first external electrode and a second external electrode disposed on ends of the capacitor body, respectively; and
a plurality of dummy electrodes disposed only on each of the plurality of dielectric layers, on which one of the plurality of first and second internal electrodes is disposed, in the active region, to be exposed through corners of the dielectric layers,
wherein each of the plurality of dummy electrodes has a width equal to 50% to 60% of a distance between the first internal electrode and the fourth surface of the capacitor body or a distance between the second internal electrode and the third surface of the capacitor body, the width being in a direction from the third surface to the fourth surface of the capacitor body,
in the capacitor body, the plurality of first and second internal electrodes are insulated from each other by the plurality of dielectric layers disposed therebetween,
each of the plurality of dummy electrodes is exposed through two surfaces of the third surface to the sixth surface,
on each of the plurality of dielectric layers, on which one of the plurality of first and second internal electrodes is disposed, the number of dummy electrodes is four and the four dummy electrodes have a same thickness as the one of the plurality of first and second internal electrodes, and
the first external electrode and the second external electrode comprise a first connection portion and a second connection portion disposed on the third and fourth surfaces of the capacitor body to be connected to the first and second internal electrodes, respectively, and a first band portion and a second band portion respectively extending from the first and second connection portions to portions of the first, second, fifth and sixth surfaces of the capacitor body, respectively.

2. The multilayer capacitor of claim 1, wherein the plurality of dummy electrodes are provided as a total of four dummy electrodes, of which each is disposed on one of four corners of a single dielectric layer on which the first internal electrode or the second internal electrode is disposed.

3. The multilayer capacitor of claim 2, wherein a length ratio of exposed portions of two dummy electrodes disposed on one dielectric layer, exposed through the third surface or the fourth surface of the capacitor body, satisfies 1:9 to 5:5.

4. The multilayer capacitor of claim 2, wherein a length ratio of exposed portions of two dummy electrodes disposed on one dielectric layer, exposed through the fifth surface or the sixth surface of the capacitor body, satisfies 1:9 to 5:5.

5. The multilayer capacitor of claim 1, wherein each of the plurality of first and second internal electrodes has a rectangular shape in a plan view in a stacking direction of the plurality of dielectric layers.

6. A multilayer capacitor comprising:
a capacitor body including an active region having a plurality of dielectric layers and a plurality of first and second internal electrodes alternately disposed with the dielectric layer interposed therebetween, and upper and lower cover layers disposed on upper and lower surfaces of the active region, the capacitor body having a first surface and a second surface opposing each other, a third surface and a fourth surface connected to the first and second surfaces and opposing each other, and a fifth surface and a sixth surface connected to the first and second surfaces, connected to the third and fourth surfaces and opposing each other, one ends of the plurality of first and second internal electrodes being exposed through the third surface and the fourth surface, respectively;
a first external electrode and a second external electrode disposed on ends of the capacitor body, respectively; and
a plurality of dummy electrodes disposed only on each of the plurality of dielectric layers, on which one of the plurality of first and second internal electrodes is disposed, in the active region, to be exposed through corners of the dielectric layers,
wherein each of the plurality of dummy electrodes has a length equal to 50% to 60% of a distance between the first internal electrode and the fifth or sixth surface of the capacitor body or a distance between the second internal electrode and the fifth or sixth surface of the capacitor body, the length being in a direction from the fifth surface to the sixth surface of the capacitor body,
in the capacitor body, the plurality of first and second internal electrodes are insulated from each other by the plurality of dielectric layers disposed therebetween,
each of the plurality of dummy electrodes is exposed through two surfaces of the third surface to the sixth surface,
on each of the plurality of dielectric layers, on which one of the plurality of first and second internal electrodes is disposed, the number of dummy electrodes is four and the four dummy electrodes have a same thickness as the one of the plurality of first and second internal electrodes, and
the first external electrode and the second external electrode comprise a first connection portion and a second connection portion disposed on the third and fourth surfaces of the capacitor body to be connected to the first and second internal electrodes, respectively, and a first band portion and a second band portion respectively extending from the first and second connection portions to portions of the first, second, fifth and sixth surfaces of the capacitor body, respectively.

7. The multilayer capacitor of claim 6, wherein the plurality of dummy electrodes are provided as a total of four dummy electrodes, of which each is disposed on one of four corners of a single dielectric layer on which the first internal electrode or the second internal electrode is disposed.

8. The multilayer capacitor of claim 7, wherein a size ratio of exposed portions of two dummy electrodes disposed on one dielectric layer, exposed through the third surface or the fourth surface of the capacitor body, satisfies 1:9 to 5:5.

9. The multilayer capacitor of claim 7, wherein a size ratio of exposed portions of two dummy electrodes disposed on one dielectric layer, exposed through the fifth surface or the sixth surface of the capacitor body, satisfies 1:9 to 5:5.

10. The multilayer capacitor of claim 6, wherein each of the plurality of first and second internal electrodes has a rectangular shape in a plan view in a stacking direction of the plurality of dielectric layers.

* * * * *